US008977413B2

(12) United States Patent
Burns et al.

(10) Patent No.: US 8,977,413 B2
(45) Date of Patent: Mar. 10, 2015

(54) METHODS FOR DERATED THRUST VISUALIZATION

(75) Inventors: Timothy Donal Paul Burns, Richmond Hill, GA (US); Aaron James Gannon, Anthem, AZ (US); Dashiell Matthews Kolbe, Grand Rapids, MI (US); Darrin Walter Wargacki, West Chester, OH (US); Gerhard Walter Moeller, Goshen, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 501 days.

(21) Appl. No.: 13/413,944

(22) Filed: Mar. 7, 2012

(65) Prior Publication Data

US 2013/0238173 A1 Sep. 12, 2013

(51) Int. Cl.
*G05D 1/00* (2006.01)
*G08G 5/00* (2006.01)

(52) U.S. Cl.
CPC ............ *G08G 5/0065* (2013.01); *G08G 5/0021* (2013.01)
USPC ................................................ 701/15; 701/8

(58) Field of Classification Search
CPC .......................... G08G 5/0021; G08G 5/0065
USPC ........................................................ 701/15, 8
See application file for complete search history.

(56) References Cited

U.S. PATENT DOCUMENTS

| | | | | |
|---|---|---|---|---|
| 5,103,224 | A * | 4/1992 | Arad | 340/959 |
| 5,499,025 | A * | 3/1996 | Middleton et al. | 340/959 |
| 6,822,624 | B2 * | 11/2004 | Naimer et al. | 345/9 |
| 8,665,120 | B2 * | 3/2014 | Thoreen | 340/975 |
| 2008/0215198 | A1 | 9/2008 | Richards | |
| 2010/0076672 | A1 * | 3/2010 | Cremers | 701/123 |
| 2010/0094488 | A1 | 4/2010 | Michal et al. | |
| 2011/0060485 | A1 | 3/2011 | Chaptal et al. | |

OTHER PUBLICATIONS

Search Report and Written Opinion from EP Application No. 13158055.7 dated Oct. 11, 2013.
Aircraft Performance, http://www.faa.gov/library/manuals/aviation/pilot_handbook/media/PHAK—Chapter 10, date prior to Mar. 7, 2012.

* cited by examiner

*Primary Examiner* — John Q Nguyen
*Assistant Examiner* — Alan D Hutchinson
(74) *Attorney, Agent, or Firm* — McGarry Bair PC

(57) ABSTRACT

Methods of illustrating one or more derated takeoffs of an aircraft on a runway where such illustrations are on a flight display in a cockpit of the aircraft and are based on various information and may allow pilots to make more accurate decisions related to derated takeoffs and full thrust takeoffs of the aircraft.

21 Claims, 3 Drawing Sheets

METHODS FOR DERATED THRUST VISUALIZATION

BACKGROUND OF THE INVENTION

In contemporary aircraft, a pilot prior to flight may manually select a takeoff thrust for the engines of the aircraft being flown. Many takeoffs are done at full or rated thrust. When a takeoff is performed at less than full thrust, it is referred to as a derated takeoff. Such derated takeoffs involve the pilot actively selecting to perform a takeoff maneuver with less than full thrust to at least one of, and typically to all of, each aircraft engine available. Currently a majority of takeoff maneuvers that could be performed at derated thrust are performed at full thrust because the perceived risk of performing the maneuver at a derated thrust outweighs any perceived benefit. Pilots are currently developing such risk assessment based on anecdotal information or gut-feelings and at best a pilot may be presented with a text statement describing the amount of runway they will have left at the derated thrust setting.

BRIEF DESCRIPTION OF THE INVENTION

In one embodiment, a method of illustrating a derated takeoff on a flight display in a cockpit of an aircraft includes displaying a runway representation on the flight display of a runway on which the aircraft is to takeoff and displaying a takeoff indicia referenced to the runway representation, with the takeoff indicia representing a location along the runway where the aircraft is airborne for a thrust setting, which is less than a full thrust setting.

In another embodiment, a method of illustrating a derated takeoff on a flight display in a cockpit of an aircraft includes displaying a runway representation on the flight display of a runway on which the aircraft is to takeoff, displaying a takeoff indicia referenced to the runway representation, with the takeoff indicia representing a location along the runway where the aircraft is airborne for a thrust setting, which is less than full thrust, and displaying a cost indicia corresponding to a takeoff at the thrust setting.

DESCRIPTION OF EMBODIMENTS OF THE INVENTION

Figure 1:
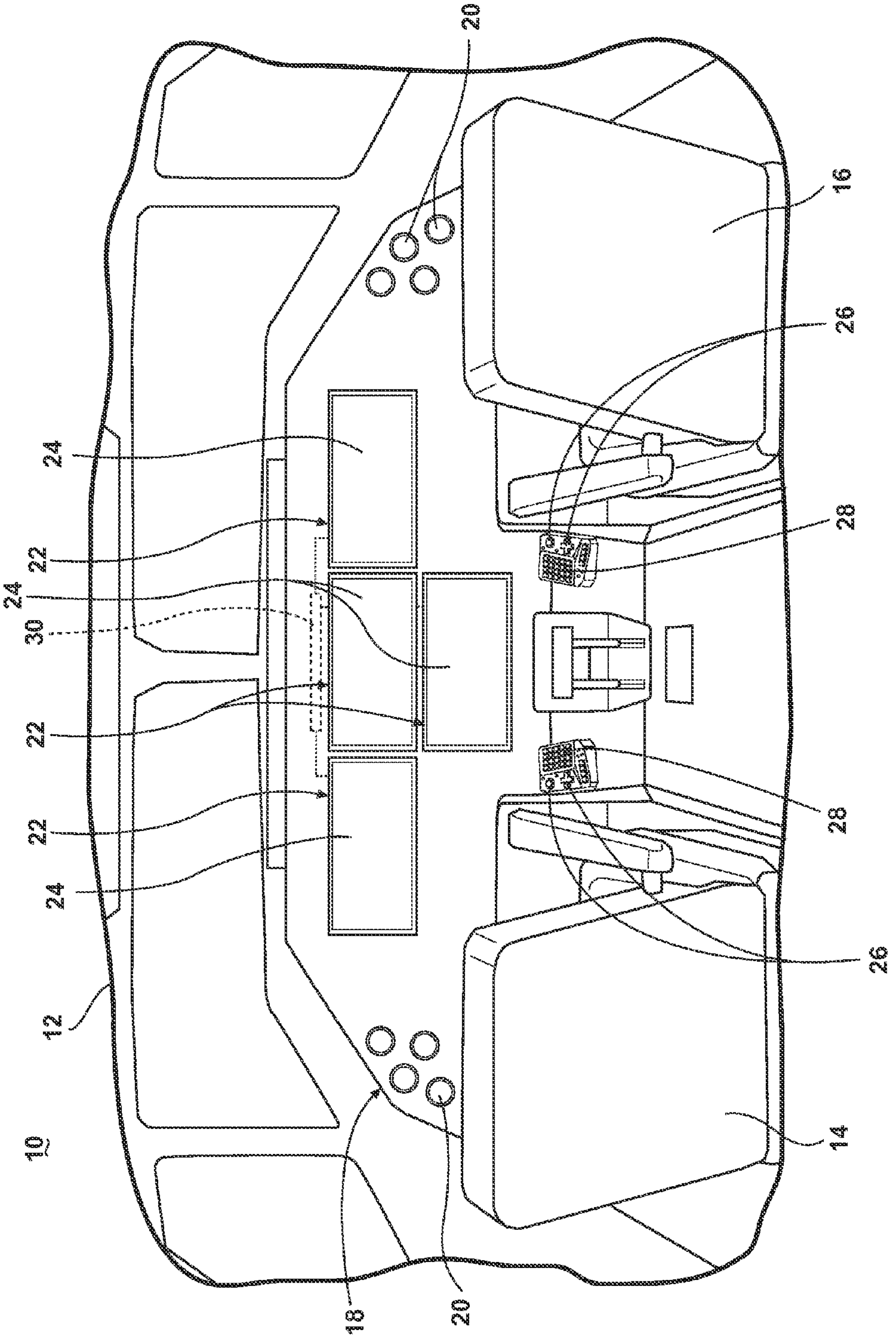
FIG. 1 is a perspective view of a portion of an aircraft cockpit with a flight display on which a derated takeoff may be illustrated according to embodiments of the invention.

FIG. 1 illustrates a portion of an aircraft 10 having a cockpit 12. While a commercial aircraft has been illustrated, it is contemplated that embodiments of the invention may be used in any type of aircraft allowing for derated engine thrust. A first user (e.g., a pilot) may be present in a seat 14 at the left side of the cockpit 12 and another user (e.g., a co-pilot) may be present at the right side of the cockpit 12 in a seat 16. A cockpit instrument panel 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26 and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may also be connected with other controllers (not shown) of the aircraft 10. The controller 30 may include memory and processing units, which may be running any suitable programs to implement a graphical user interface (GUI) and operating system. These programs typically include a device driver that allows the user to perform functions on the touch screen surface 24 such as selecting options, inputting commands and other data, selecting and opening files, and moving icons through the touch screen surface 24.

The controller 30 may include a computer searchable database of information (not shown) or may be operably coupled to a database of information. For example, such a database may be stored on an alternative computer or controller. It will be understood that the database may be any suitable database, including a single database having multiple sets of data, multiple discrete databases linked together, or even a simple table of data. A pilot may have the ability to upload preferential cockpit configuration data upon system startup such as through a flight guidance or flight mode select control panel that may be displayed on the touch screen surface 24, the cursor control devices 26, and/or the multifunction keyboards 28. The default cockpit configuration may take into consideration regulatory requirements e.g., FAA, airline company or aircraft operator, operations manual or specifications requirements and also pilot preference for cockpit configuration of thrust modes, instrument and display layouts, company, airfield, and regulatory recommended, best practices and pilot optioned best practices for start-up, taxi, takeoff, departure procedures, climb, cruise, descent, arrival procedures, approach procedure selection, landing, reverse thrust usage, and taxi techniques. The database may also include runway data, aircraft performance data, engine performance data, runway surface conditions, current outside weather conditions, historical takeoff performance, and current fuel prices. It is contemplated that such a database may be located off the aircraft 10 at a location such as airline or flight operations department control (not shown) or another location and that the controller 30 may be operably coupled to a wireless network (not shown) over which the database information may be provided to the controller 30. This database may include pilot preferential data inputted via electronic means i.e. flash memory, internet, WiFi, LAN, SatComm or other electronic delivery means.

During operation, the controller 30 may utilize inputs from the pilot, the database, and/or information from airline control or flight operations department to present a graphic depiction of the predicted takeoff performance of the aircraft 10. The pilot may be able to use the input device to adjust the derated setting of the thrust of the engines of the aircraft 10 and the controller 30 may update the flight display 22 based on the selection. Once the pilot has determined that a suitable selection has been made, the pilot may use the input device to accept and activate the takeoff parameters.

Figure 2:
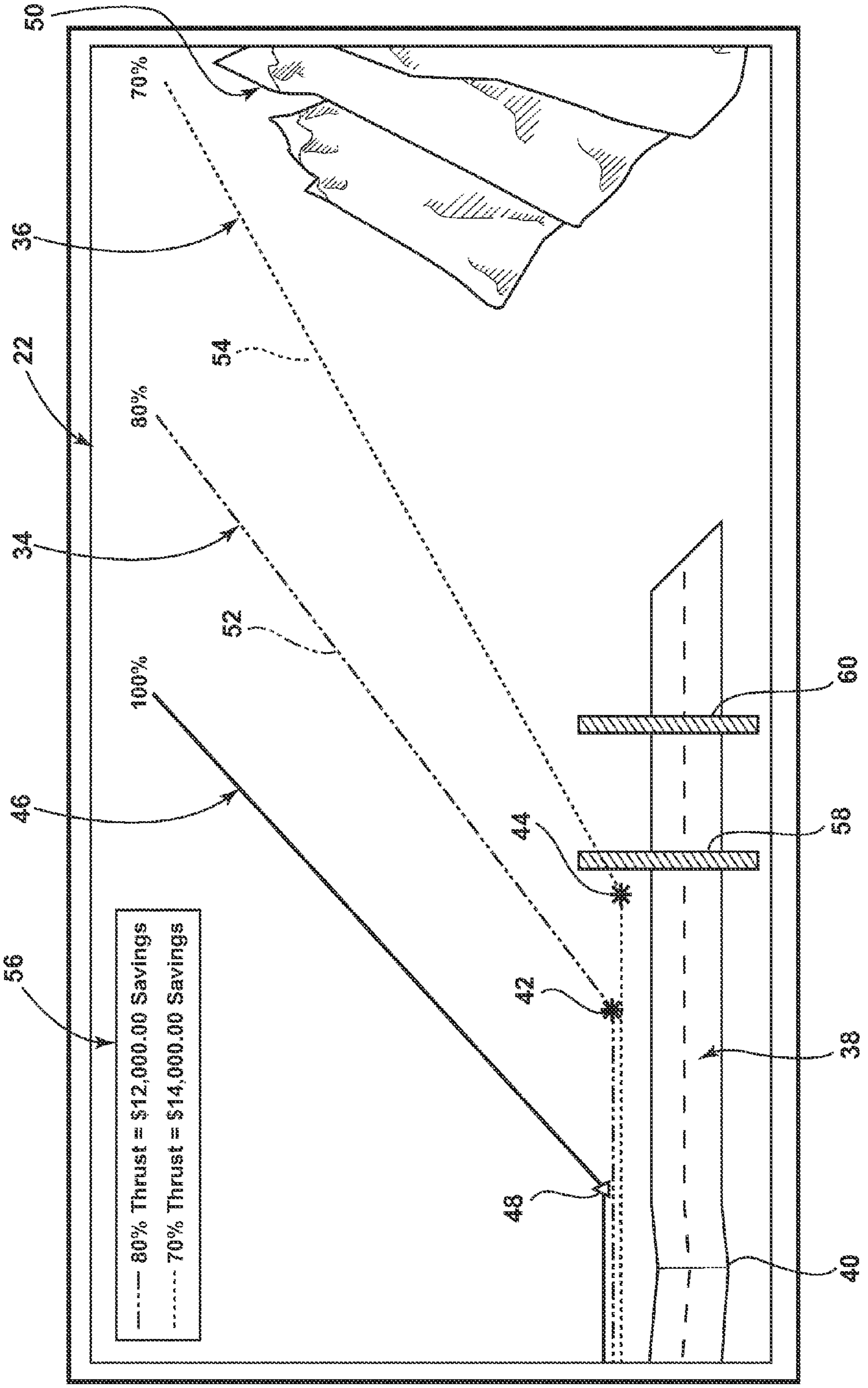
FIG. 2 is a schematic view of an illustration of a derated takeoff according to a first embodiment of the invention.

Referring now to FIG. 2, a first embodiment showing the illustration of several derated takeoff settings 34 and 36 for the aircraft 10 is shown. The derated takeoff setting 34 correlates to a setting having 80% of the full thrust available and the derated takeoff setting 36 correlates to a setting having 70% of the full thrust available. It is contemplated that the entire climb profile, including multiple segments thereof may be illustrated.

A runway representation 38 of the runway on which the aircraft 10 is to takeoff is displayed on the flight display 22. It will be understood that the runway representation 38 may be graphically illustrated in a variety of ways and that various aspects of the runway may be illustrated on the flight display 22 to better aid the pilot in making decisions with respect to the derated takeoff thrust setting. For example, the runway representation 38 may be made 3D, may illustrate various characteristics of the runway including the centerline and slope. By way of further example, the runway representation 38 includes an undulation indicator 40 where a dip is located in the runway.

Takeoff indicia for the derated takeoff settings 34 and 36 are also displayed in reference to the runway representation 38. The takeoff indicia may represent a location along the runway where the aircraft 10 is airborne for a corresponding thrust setting, which is less than a full thrust setting. For example, a first takeoff indicia 42 represents where the aircraft 10 will be airborne for the derated takeoff setting 34 and a second takeoff indicia 44 represent where the aircraft 10 will be airborne for the derated takeoff setting 36.

The illustration may also give an indication of where the aircraft 10 may takeoff under a full thrust setting to give the pilot a basis to make a comparison. For example, a full thrust setting 46 has been illustrated with takeoff indicia 48. While the flight display 22 has been illustrated as displaying multiple takeoff indicia, it will be understood that only a single derated takeoff setting and its corresponding takeoff indicia may be shown at a time either with or without the full thrust setting illustrated for comparison. Further, the takeoff indicia may take many forms to illustrate the point where the aircraft 10 will be airborne. For example, the takeoff indicia may include but is not limited to marking at least the point of takeoff of the aircraft 10 or may include a bar or zone representing the takeoff distance ending at the takeoff point.

The takeoff indicia 42 and 44 for each of the illustrated derated takeoff settings 34 and 36 may represent a variety of things including the location at which all wheels of the aircraft 10 are predicted to be out of contact with the runway. The takeoff indicia 42 and 44 may also represent the location at which the aircraft 10 will clear any known obstacles, such as the obstacle 50, beyond the runway at the derated takeoff setting. Such obstacle information may be available from a terrain database. The takeoff indicia 42 and 44 may also illustrate a predicted distance needed for the aircraft 10 to takeoff at the derated takeoff setting. The takeoff indicia 42 and 44 may illustrate any combination of such takeoff information on the flight display 22. The illustration may also give an indication of the effect of a loss of an engine at some point during takeoff and it may be indicated that the aircraft may continue to climb at the derated thrust after that point on one engine. The illustration may also show required changes to the thrust when an engine is lost and it may be shown whether such changes may be implemented automatically by the controller 30. Further, the illustration may also give some indication of any procedural thrust setting changes along the profile (e.g., normal power reduction, or power reduction required by noise abatement). Further still, the illustration may also give some indication of the effects of inoperative equipment such as inoperative anti-skid or the use of emergency braking.

It will be understood that the location of the takeoff indicia 42 and 44 may be predicted based on at least one of: runway data, aircraft performance, engine performance, runway surface conditions, and current outside weather conditions. That is the controller 30, or a computer located off the aircraft 10, may determine the location of takeoff of the aircraft 10 based on a variety of information available to it. Runway data may include information related to the structure of the runway including its shape, location, length, non-standard climb gradients, and slope. Such information may come from a runway database. Aircraft performance may include aerodynamics of the aircraft 10 and engine performance may include precision performance characteristics of the engines on the aircraft 10. Runway surface conditions may include information related to the type of material forming the runway, as well as weather the runway is currently slick or icy. Current outside weather conditions may include, among other things, air temperature, wind direction, and wind speed. The location of the takeoff indicia 42 and 44 may also take into consideration the weight and balance of the aircraft itself.

A takeoff trajectory for each of the illustrated derated takeoff settings may also be displayed. For example, a first takeoff trajectory 52 for the derated takeoff setting 34 and a second takeoff trajectory 54 for the derated takeoff setting 36 are shown. The illustration of the takeoff trajectories 52 and 54 are with reference to the runway representation and may be particularly useful where there are known obstacles such as the obstacle 50.

Cost indicia 56 corresponding to the takeoffs at the derated takeoff settings may also be displayed. Such indicia may illustrate a cost savings of the takeoff at the derated takeoff settings relative to a takeoff at the full thrust setting. For exemplary purposes, the cost indicia 56 illustrate the cost savings for each derated takeoff setting in dollars. The cost indicia 56 may be illustrated in other manners both graphically and in terms of what information is provided. For example, the cost indicia 56 could alternatively indicate the pounds of fuel that will be saved at the derated takeoff setting or give information related to some pilot incentive related to the derated takeoff setting.

Braking indicia 58 with reference to the runway representation 38 may be included and may illustrate the location beyond takeoff indicia 42 at which the aircraft 10 is predicted to stop after aborting the takeoff. It is contemplated that the braking indicia 58 may illustrate at least the location at which the aircraft 10 will stop on the runway under full braking after aborting the takeoff at the location indicated by the takeoff indicia 42. Similarly, braking indicia 60 is shown for the corresponding takeoff indicia 44.

Figure 3:
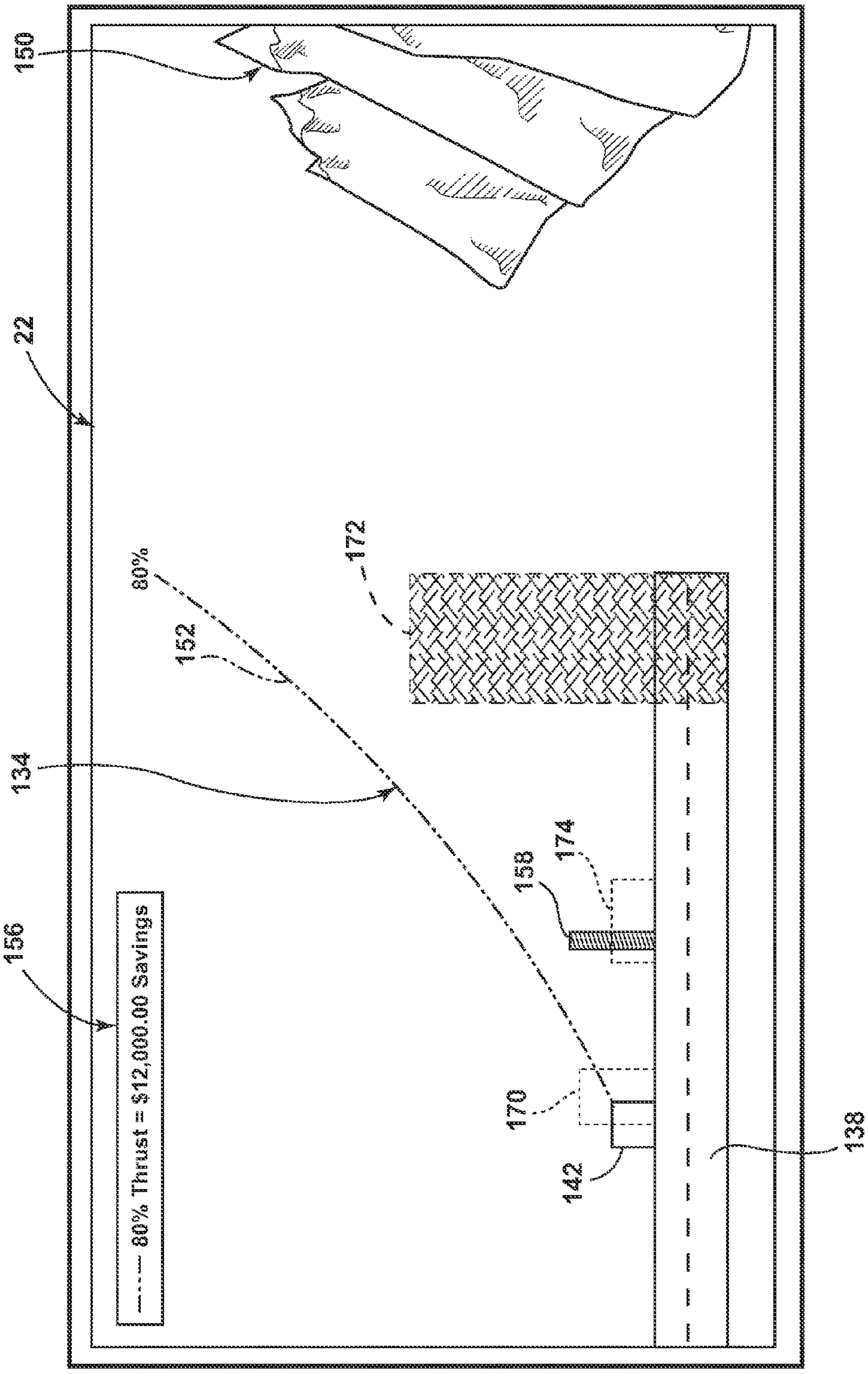
FIG. 3 is a schematic view of an illustration of a derated takeoff according to a second embodiment of the invention.

FIG. 3 illustrates a second embodiment of an exemplary flight display 22 illustrating a derated takeoff setting 134. The second embodiment is similar to the first embodiment; therefore, like parts will be identified with like numerals increased by 100, with it being understood that the description of the like parts of the first embodiment applies to the second embodiment, unless otherwise noted. The derated takeoff setting may have been selected by the pilot and illustrated on the flight display 22 to give the pilot information regarding the derated thrust. The controller 30 may update the flight display 22 with runway information, savings information, and performance information. Like the earlier embodiment a runway representation 138, takeoff indicia 142, takeoff trajectory 152, cost indicia 156, and braking indicia 158 have been included for the derated takeoff setting 134. Unlike the first embodiment the takeoff indicia 142 has been illustrated as zone, which represents the takeoff distance ending at the takeoff point. Further, the takeoff trajectory 152 has been shown as having different characteristics.

Unlike the first embodiment, historical takeoff indicia 170 has also been included and illustrates the location along the runway for prior aircraft takeoffs at the same derated takeoff setting. The prior aircraft takeoff information considered in determining the historical takeoff indicia may be for the current aircraft 10 that is being flown, for the same or similar type of aircraft as the current aircraft 10 being flown, or a combination of the two. The historical takeoff indicia may illustrate a variety of historical information regarding the prior aircraft takeoffs. For example, the historical takeoff indicia 170 may include an average of all of the takeoffs, a running average, a sliding average, etc. Such information may allow the pilot to see how previous flights performed at such a derated takeoff setting. It is contemplated that upon takeoff, the aircraft's takeoff performance data may be stored to a data repository to be accessible by future flights in determining the historical takeoff indicia 170. It is contemplated that the historical database may pick out trends of the historical data and that the historical takeoff indicia 170 may shift or grow as more information is available. Historical indicia may be included for any of the other indicia given on the flight display 22 including for the braking indicia and may be determined by the use of FDM, FOQA or other historical database tracking system.

Further, safety indicia 172 has also been included for the derated takeoff setting 134. Such safety indicia 172 may indicate a safety margin for a takeoff at the derated takeoff setting 134. The safety margin indicated by the safety indicia 172 may be determined by the airline operator and may include a set amount of length at the end of the runway, such as 2,000 feet, that the airline operator wishes to maintain as a safety barrier for safety issues such as malfunctioning or sub-functioning brakes. Further, it is contemplated that the pilot may include a custom safety margin such as the airline control margin plus an additional percentage or factor due to runway conditions, equipment malfunctions or regulatory requirements.

It is also contemplated that error indicia 174 illustrating the potential error in other various information may be displayed on the flight display 22. For example, error indicia 174 has been given with respect to the braking indicia 158. In the exemplary instance the error indicia 174 indicates the error in the calculation of the braking indicia 158. It is contemplated that if the error indicia 174 indicates that the braking indicia 158 overlaps with the safety indicia 172 then the pilot may be instructed to select a different derated takeoff setting or an indication of such an overlap may be given on the flight display 22. Error indicia may be included for any of the indicia given on the flight display 22 and may be determined in by the use of FDM, FOQA or other historical database tracking system.

It is contemplated that the controller 30 may be capable of autocorrecting the pilot selection of the derated takeoff setting if the error indicia 174 or the historical takeoff indicia 170 indicate that braking of the aircraft 10 may not occur before the safety margin. The auto-correction of the takeoff derated selection utilizes historical FOQA or FDM type data to determine error indicia with automatic resetting of takeoff power done by comparing data gathered to airline, company or regulatory requirements for takeoff power selection.

It is also contemplated that additional information may be displayed on the flight display 22 with respect to the derated takeoff setting 134. For example, if a pilot derates the thrust of the engines by 20%, resulting in over 2000 ft. of runway remaining when they actually takeoff, the pilot will be presented with a list of runways that this accurately correlates with when taking off at full thrust. It is assumed that such a correlation will provide the pilot with reassurance that performing the 20% derated thrust is physically identical to operating at full thrust on another runway and the pilot will be more likely to operate under the derated thrust accordingly. In this manner it may be conveyed to the pilot that while the aircraft 10 may run a little longer on the given runway as it is not as difficult of a runway to takeoff on. Further, it will be understood that any portion of the described indicia in the embodiments above may be used on the flight display 22 and that any of the functionality of the two embodiments described above may be combined with each other in any manner. It is also contemplated that indicia may be included to show the effects of the takeoff on the long-term reliability of the aircraft; for example, indicia to illustrate the effects of the thrust setting on engine wear and tear may be included.

The above described embodiments provide a variety of benefits including that the pilot may make a more accurate assessment of the results of a derated takeoff setting. The technical effect of the embodiments of the invention being that the pilot is presented with a graphical representation of the predicted takeoff performance when performed with derated thrust of the engines and may aid in alleviating pilot concerns regarding runway length. This may subsequently result in an increase in the likelihood of the pilot performing the derated takeoff maneuver. The selection of the derated takeoff setting saves a significant amount of fuel and extends the life of the engines on the aircraft by reducing stress on life-limited components, greatly reducing the operating costs of the airline and other flight operators. As fuel represents the single greatest cost to such operators a reduction would provide an immediate benefit. Further, the crew of the aircraft may be provided with additional helpful information such as predicted remaining runway or stopping time for the aircraft which may result in improved operation of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of illustrating a derated takeoff on a flight display in a cockpit of an aircraft, the method comprising:

displaying a runway representation on the flight display of a runway on which the aircraft is to takeoff; and displaying a takeoff indicia on the flight display referenced to the runway representation, with the takeoff indicia representing a location along the runway where the aircraft is beginning to takeoff for a derated thrust setting which is less than a full thrust setting, and displaying the derated thrust setting on the flight display referenced to the takeoff indicia.

2. The method of claim 1, further comprising displaying a cost indicia corresponding to a takeoff at the derated thrust setting.

3. The method of claim 2 wherein the cost indicia illustrates a cost savings of the takeoff at the derated thrust setting relative to a takeoff at the full thrust setting.

4. The method of claim 1 wherein the takeoff indicia represents the location at which all wheels of the aircraft are predicted to be out of contact with the runway.

5. The method of claim 4 wherein the takeoff indicia represents the location at which the aircraft will clear any known obstacles beyond the runway at the derated thrust setting.

6. The method of claim 1 wherein the takeoff indicia further illustrates a predicted distance needed for the aircraft to takeoff at the derated thrust setting.

7. The method of claim 1, further comprising displaying multiple takeoff indicia, with each takeoff indicia representing a different derated thrust setting.

8. The method of claim 7, further comprising displaying a cost indicia for each of the multiple takeoff indicia.

9. The method of claim 8 wherein the cost indicia indicates a cost savings of the takeoff at the derated thrust setting relative to a takeoff at the full thrust setting.

10. The method of claim 1 wherein the location of the takeoff indicia is predicted based on at least one of: aircraft performance, engine performance, runway data, runway surface conditions, inoperative equipment, required climb gradients, obstacles, and current outside weather conditions.

11. The method of claim 1, further comprising displaying a braking indicia referenced to the runway representation and illustrating the location beyond the takeoff indicia at which the aircraft is predicted to stop after aborting the takeoff.

12. The method of claim 11 wherein the braking indicia illustrates at least the location at which the aircraft will stop on the runway under full braking after aborting the takeoff at the location indicated by the takeoff indicia.

13. The method of claim 1, further comprising displaying a historical takeoff indicia illustrating the location along the runway for prior aircraft takeoffs at the derated thrust setting.

14. The method of claim 13 wherein the prior aircraft takeoffs are for at least one of: the current aircraft or same type of aircraft as the current aircraft.

15. The method of claim 1, further comprising displaying a takeoff trajectory referenced to the runway representation.

16. The method of claim 1, further comprising displaying safety indicia indicating a safety margin for a takeoff at the thrust setting.

17. A method of illustrating a derated takeoff on a flight display in a cockpit of an aircraft, the method comprising:

displaying a runway representation on the flight display of a runway on which the aircraft is to takeoff;

displaying a takeoff indicia on the flight display referenced to the runway representation, with the takeoff indicia representing a location along the runway where the aircraft is beginning to beginning to takeoff for a derated thrust setting which is less than a full thrust setting;

displaying a cost indicia on the flight display corresponding to a takeoff at the thrust setting, and displaying the derated thrust setting on the flight display referenced to the takeoff indicia.

18. The method of claim 17, further comprising displaying at least one of:

a) a braking indicia referenced to the runway representation and illustrating the location beyond the takeoff indicia at which the aircraft is predicted to stop after aborting the takeoff;

b) a historical takeoff indicia illustrating the location along the runway for prior aircraft takeoffs;

c) a takeoff trajectory referenced to the runway representation; and d) a safety indicia indicating a safety margin for a takeoff at the derated thrust setting.

19. The method of claim 18, further comprising displaying multiple takeoff indicia, with at least some of the takeoff indicia representing a different derated thrust setting.

20. The method of claim 19, wherein one of the takeoff indicia represents a full thrust setting.

21. A method of illustrating a derated takeoff on a flight display in a cockpit of an aircraft, the method comprising:

displaying a runway representation on the flight display of a runway on which the aircraft is to takeoff; and displaying a plurality of takeoff indicia on the flight display referenced to the runway representation, with the takeoff indicia representing a location along the runway where the aircraft is beginning to takeoff for a corresponding thrust setting, with one of the indicia corresponding to a first thrust setting and another of the indicia corresponding to a second thrust setting, which is different from the first thrust setting, with one of the first and second thrust settings is a derated thrust setting, which is less than the full thrust setting.

* * * * *